(12) United States Patent
Godowski

(10) Patent No.: US 9,283,673 B2
(45) Date of Patent: Mar. 15, 2016

(54) FAST RUNNER LIMB ARTICULATION SYSTEM

(75) Inventor: Johnny Godowski, Pensacola, FL (US)

(73) Assignee: Florida Institute for Human and Machine Cognition, Inc., Pensacola, FL (US)

( * ) Notice: Subject to any disclaimer, the term of this patent is extended or adjusted under 35 U.S.C. 154(b) by 881 days.

(21) Appl. No.: 13/362,213

(22) Filed: Jan. 31, 2012

(65) Prior Publication Data

US 2013/0192406 A1    Aug. 1, 2013

(51) Int. Cl.
     *A63H 3/20*      (2006.01)
     *A63H 11/18*     (2006.01)
     *B25J 9/10*      (2006.01)

(52) U.S. Cl.
CPC . *B25J 9/106* (2013.01); *A63H 3/20* (2013.01); *A63H 11/18* (2013.01); *Y10T 74/20329* (2015.01)

(58) Field of Classification Search
CPC ............ A63H 3/20; A63H 3/36; A63H 3/46; A63H 11/00; A63H 11/18; B62D 57/02; B62D 57/032
USPC .......... 446/330, 355, 356, 376, 377, 380, 381
See application file for complete search history.

(56) References Cited

U.S. PATENT DOCUMENTS

| | | | | |
|---|---|---|---|---|
| 61,416 A * | 1/1867 | Goodwin | ............... | A63H 11/18 446/356 |
| 4,202,423 A * | 5/1980 | Soto | ............... | B62D 57/02 180/8.6 |
| 4,511,011 A * | 4/1985 | Bartholet | ............... | B62D 57/02 180/8.6 |
| 4,762,513 A * | 8/1988 | Choy | ............... | A63H 11/00 446/359 |
| 5,121,805 A * | 6/1992 | Collie | ............... | B62D 57/024 180/8.1 |
| 5,219,410 A * | 6/1993 | Garrec | ............... | F16H 21/10 180/8.1 |
| 5,498,193 A * | 3/1996 | Locricchio | ............... | A63H 7/00 446/361 |
| 6,109,378 A * | 8/2000 | Paakkunainen | ........ | B25J 9/1065 180/8.5 |
| 6,244,924 B1 * | 6/2001 | Liu | ............... | A63H 11/00 40/420 |
| 6,478,314 B1 * | 11/2002 | Klann | ............... | A63H 11/00 180/8.1 |
| 6,532,400 B1 * | 3/2003 | Jacobs | ............... | B25J 9/1075 318/568.11 |
| 2010/0185301 A1 * | 7/2010 | Hansen | ............... | A61F 2/6607 623/47 |

* cited by examiner

*Primary Examiner* — Gene Kim
*Assistant Examiner* — Alyssa Hylinski
(74) *Attorney, Agent, or Firm* — J. Wiley Horton

(57) ABSTRACT

A robotic limb structure which is capable of achieving high speeds. In the context of a biped, the structure is used for a pair of hind limbs. The limb structure includes a primary driven link—such as a thigh pivoting about a hip joint in the case of a hind limb. Secondary links are pivotally connected to the primary driving link. Auxiliary links are provided to constrain the motion between the links. Elastic trim elements are also provided to define a "relaxed" state for the limb and to influence the resonance characteristics of the structure. The control system takes advantage of the resonant characteristics of the structure as a whole.

14 Claims, 13 Drawing Sheets

FAST RUNNER LIMB ARTICULATION SYSTEM

CROSS-REFERENCES TO RELATED APPLICATIONS

Not Applicable.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of robotics. More specifically, the invention comprises a limb articulation system which takes advantage of resonance and mechanical amplification in multi-link leg structures analogous to those found in nature. The invention also features a "dual state" suspension system—again analogous to natural structures—in which the suspension can be switched between a resting/locked state and a moving/free state.

2. Description of the Related Art

Walking robots are in theory capable of traversing irregular terrain and performing many of the functions now performed by human beings. In order to perform similar functions, however, one must typically include multi-link limb systems such as found in natural bipeds and quadrupeds. Such systems have three, four, or more pivoting joints.

The prior art approach has been to provide actuators at each pivoting joint of a multi-link limb system. These actuators apply mechanical force to set a desired angular relationship between the two links that meet at a particular pivoting joint. Sensors at each joint also frequently measure the angular relationship and provide this information to a control system.

Examples of such systems include "Asimo" from Honda (a humanoid biped), "Flame" from Delfts University in the Netherlands (another humanoid biped), and Big Dog, from Boston Dynamics and the Defense Advanced Research Projects Agency (a quadruped). All of these robots are capable of balanced walking at a relatively slow speed. They employ active actuators at each joint in order to directly control the angular relationship between each link in each limb.

The prior art walking robots are incapable of fast speeds. For example, Asimo is capable of only 1.8 mph. Big dog—being a quadruped—can go considerably faster (about 7.4 mph in a trotting gait). However, the prior designs are constrained to walking or trotting gaits which ultimately limit their speed. The speed is constrained by actuator velocity limitation. The prior art contains no velocity amplifying structures, so the actuator velocity limitation is a significant one.

The prior designs do not exploit the natural resonance properties found in animal limbs. It therefore fails to utilize the propulsive motions found in nature. This is true for several reasons. First, the prior designs tend to place relatively heavy actuators near the distal end of the limbs. These add mass which must be swung during the motion of the limbs—thereby limiting the obtainable speed. More importantly, though, the prior art structures simply do not behave like natural limbs in a running gait.

Natural limbs transition through two or more states when an animal changes from walking to running. The operation of the limbs in a running gait is fundamentally different from the operation of the limb in a walking gait. The limbs of a fast animal—such as an ostrich or a horse—undergo significant resonance while the animal is running. The "actuators" (muscles and associated structure), the elastic elements (connective tissues), and the "control system" (the central nervous system) all take advantage of this natural resonance to drive the limb to a high cyclic rate. The result is a motion amplification system that allows the motion of the primary "strong" link (such as the thigh) to be greatly amplified in the portion of the limb which actually contacts the ground.

While the resonance characteristics are most visible in a running gait, they also naturally exist for walking and trotting. In a walk, the resonance in primarily driven by gravity. At higher speeds the resonance is driven by the nonlinear elastics—since when an animal is running its legs are moving much faster than they could move as a pendulum.

Prior art robots do not take advantage of these phenomena, and this is one of the main reasons why prior art robots have been limited in speed. The present invention proposes a robotic limb system which is more closely analogous to the structures found in nature. This novel approach allows a robot constructed according to the present invention to attain much higher speeds. The inventive approach also permits the use of lower energy to achieve the same speed as for the prior art robots.

BRIEF SUMMARY OF THE INVENTION

The present invention comprises a robotic limb structure which is capable of achieving high speed and high efficiency. In the context of a quadruped, the structure may be applied to both forelimbs and hind limbs. In the context of a biped, the structure is used for a pair of limbs.

The limb structure includes a primary driven link—such as a thigh pivoting about a hip joint in the case of a hind limb. The driving force intended to move the entire limb structure is applied solely—or at least primarily—to this primary driving link. Secondary links are pivotally connected to the primary driving link. Auxiliary links are provided to constrain the motion between the links. Elastic trim elements are also provided to define a "relaxed" state for the limb and to influence the resonance characteristics of the structure.

A control system is provided to control the force input to the limb. The force input will generally be non-linear. The control system takes advantage of the resonant characteristics of the structure as a whole. This allows the attainment of various degrees of velocity amplification between the primary driving link and the portion of the limb actually in contact with the ground. The velocity amplification will be small for a walking gait, but much larger for a running gait.

An alternate suspension state allows one or more degrees of freedom—such as a knee joint or a set of tendons which may cross many joints—to be selectively latched. This feature allows the limb to lock into a standing position when the animal is at rest or moving slowly (while minimizing the use of energy to overcome gravity). The limb may be switched to a second, free state when rapid motion is required.

REFERENCE NUMERALS IN THE DRAWINGS

| | |
|---|---|
| 01 pelvis | 10 hip joint |
| 12 pendulum oscillation trajectory | 14 linear oscillation trajectory |
| 16 combined loop | 18 thrust stroke |
| 20 thigh | 22 swing stroke |
| 24 thigh motion | 26 achilles linkage |
| 28 achilles lever | 30 knee joint |
| 32 achiles joint | 34 latching link |
| 36 latching link pivot | 38 canting latch |
| 40 calf | 42 latching slide |
| 44 slide joint | 46 latch driving joint |
| 50 ankle joint | 52 weight resultant force |
| 54 weight | 56 calf extension |
| 60 foot | |
| 62 upper elastic trim element | 64 lower elastic trim element |
| 66 anchor point | 68 anchor point |
| 70 phalanx joint | 72 anchor point |
| 74 anchor point | 76 phalanx lever |
| 80 phalanx | 81 forelimb structure |
| 82 upper Achilles joint | 83 hind limb structure |
| 110 upper shoulder joint | 112 sliding carrier |
| 114 posterior actuator | 116 anterior actuator |
| 118 pivot joint | 120 shoulder blade |
| 122 pivot joint | 124 pivot joint |
| 130 shoulder joint | 131 proximal extender joint |
| 132 resonant crest curve | 133 arm |
| 134 amplitude response curves | 141 extender linkage |
| 150 elbow joint | 151 distal extender joint |
| 160 forearm | 161 metacarpal |
| 162 wrist joint | 170 phalanx joint |
| 180 phalanx | 182 limb |
| 184 non-linear elastic restraint | 186 thigh lever |
| 188 knee suspension | 190 toe suspension |
| 192 front extensor spring | 194 back extensor spring |
| 196 passive swing spring | 198 toe flexion tendon network |
| 200 toe extension tendon network | |

DETAILED DESCRIPTION OF THE INVENTION

Figure 1:
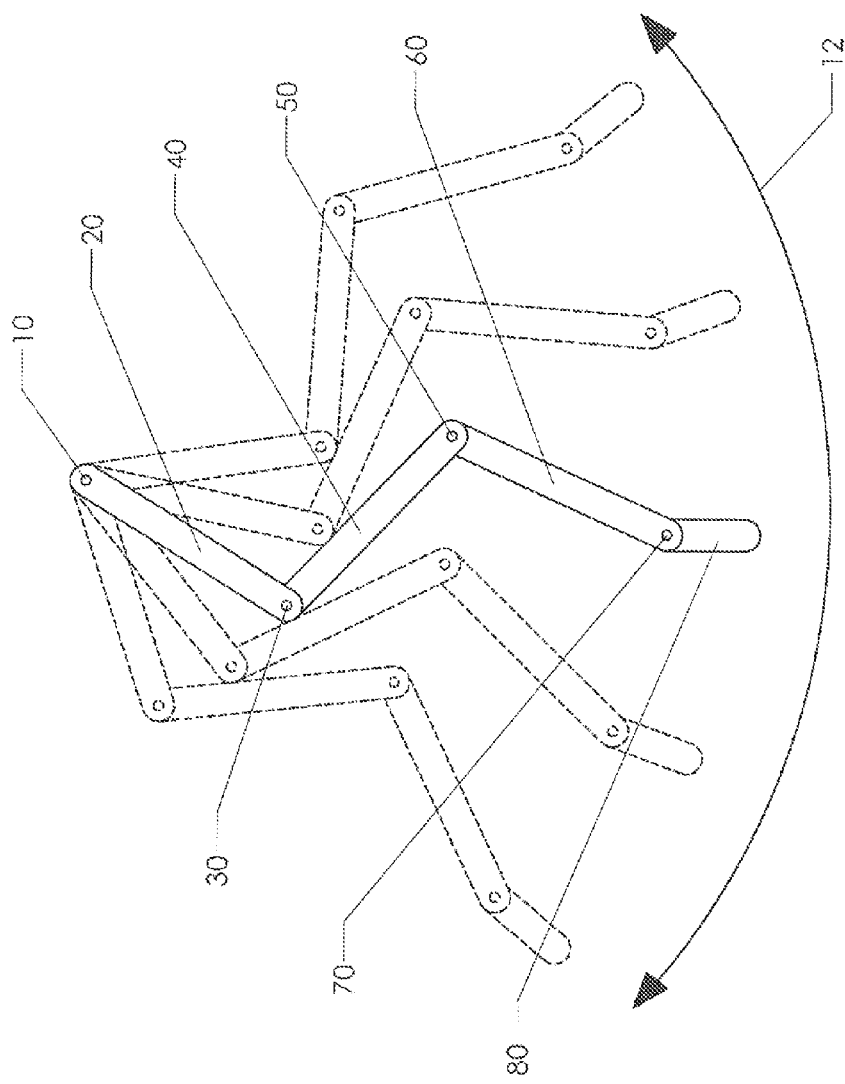
FIG. 1 shows a four link limb undergoing pendulum oscillation.

The resonance characteristics of a multi-link limb structure are best understood by studying its basic components. FIG. 1 shows a limb having four links. Thigh 20 pivots about hip joint 10. Calf 40 is pivotally attached to thigh 20 at knee joint 30. Foot 60 is pivotally connected to calf 40 at ankle joint 50. Finally, phalanx 80 is pivotally connected to foot 60 at phalanx joint 70.

In the absence of other influences, gravity will pull all four links downward and they will simply hang vertically. Elastic connections are preferably therefore made between the links so that a non-aligned "resting state" is created. The position shown as a solid line in FIG. 1 is the resting state of the assembly. If an actuator is used to pivot thigh 20 about hip joint 10, a pendulum motion will result. The assembly will tend to pivot clockwise and counterclockwise in the way a pendulum pivots. This swinging arc is shown as pendulum oscillation trajectory 12. The phantom lines show alternate positions for the assembly as it swings through this arc.

Those skilled in the art will realize that a pendulum has a natural frequency. If the pivoting motion of thigh 20 is driven at this frequency, the amplitude of the arcuate displacement will be maximized.

Figure 2:
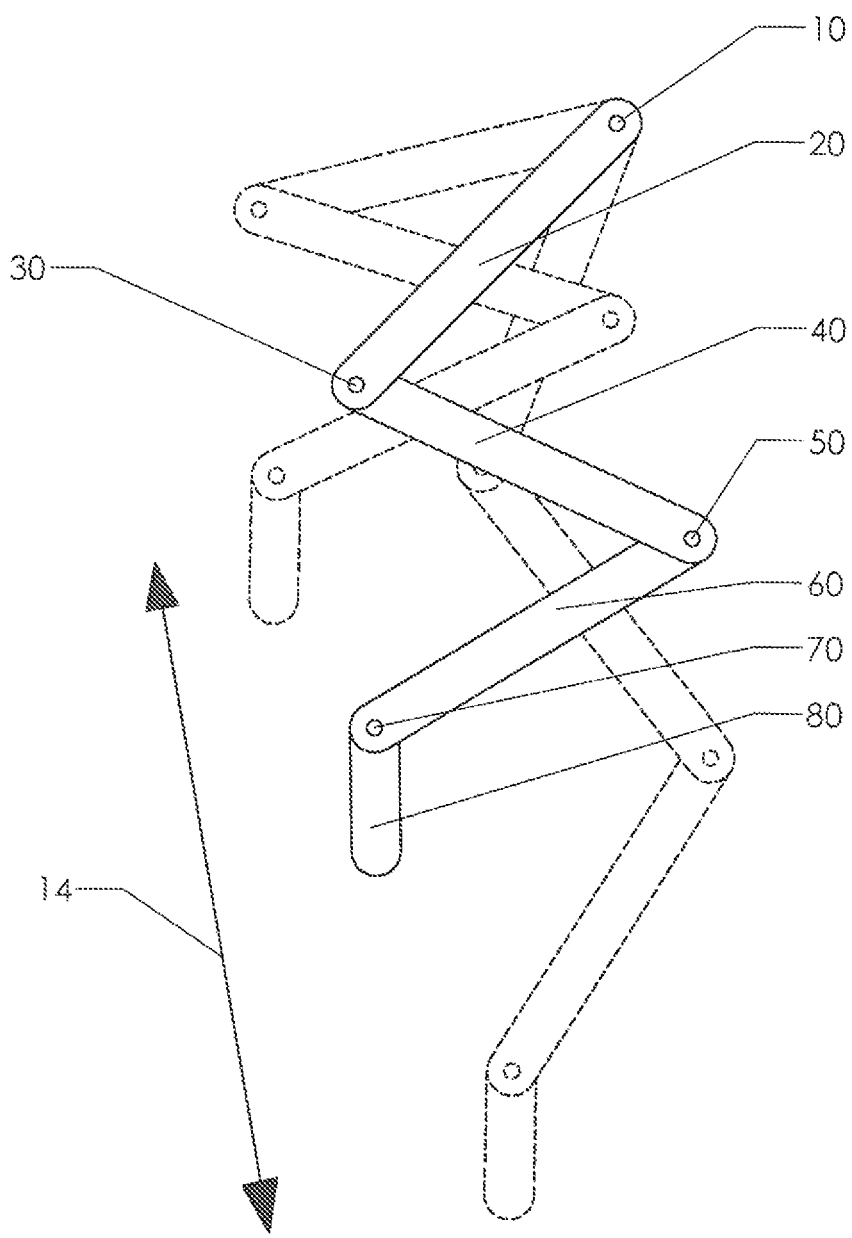
FIG. 2 shows a four link limb undergoing linear oscillation.

FIG. 2 shows the same assembly undergoing linear oscillation. As disclosed previously, elastic elements interconnect the pivoting links of the limb assembly. The presence of these elastic elements will also produce a natural linear oscillation frequency for the limb as a whole. If hip joint 10 is moved up and down (or rotated) at the natural linear frequency of the assembly, then a linear oscillation trajectory will result. The limb will then cyclically extend and retract.

Of course, the pendulum and linear oscillation modes do not exist independently of each other. There will always be cross-coupling between these two modes. However, it is important to consider these two fundamental modes when studying the natural motions of a running gait.

Figure 3:
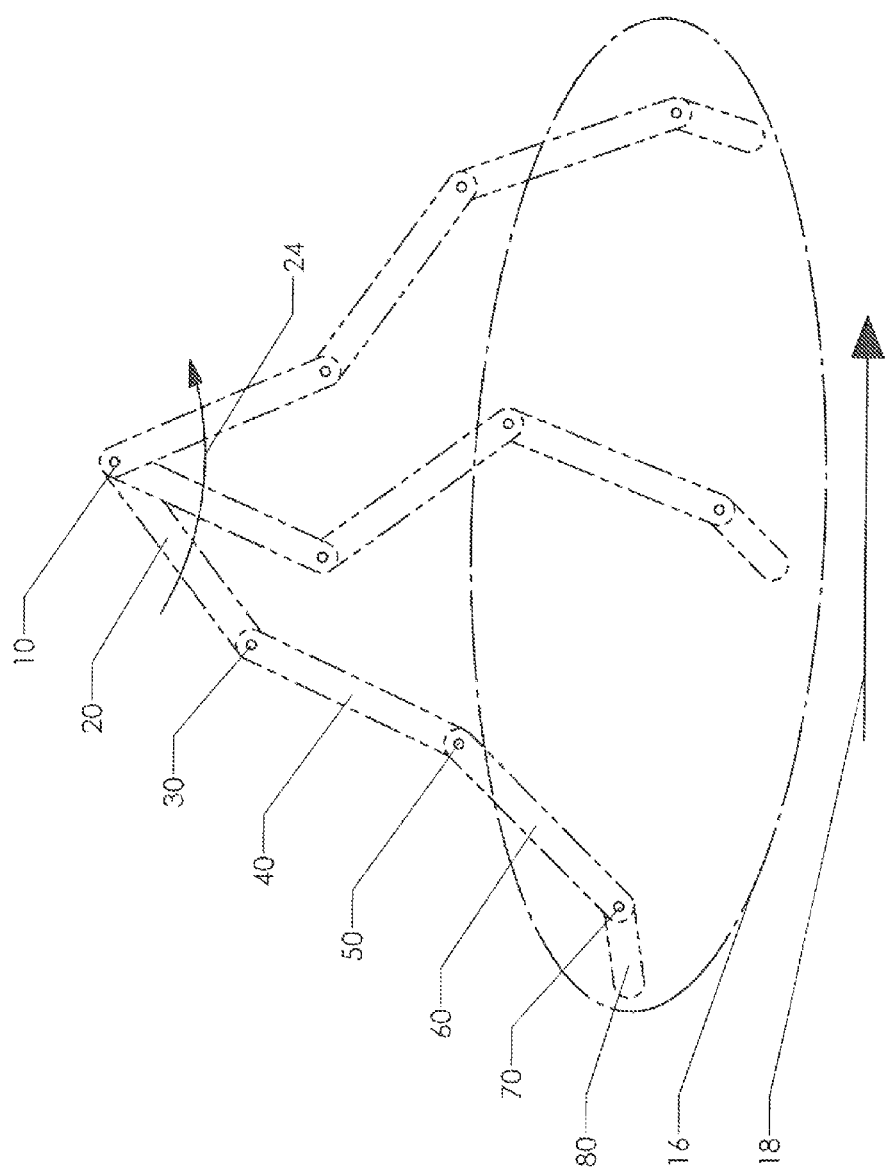
FIG. 3 shows a four link limb undergoing combined pendulum and linear oscillation.
Figure 4:
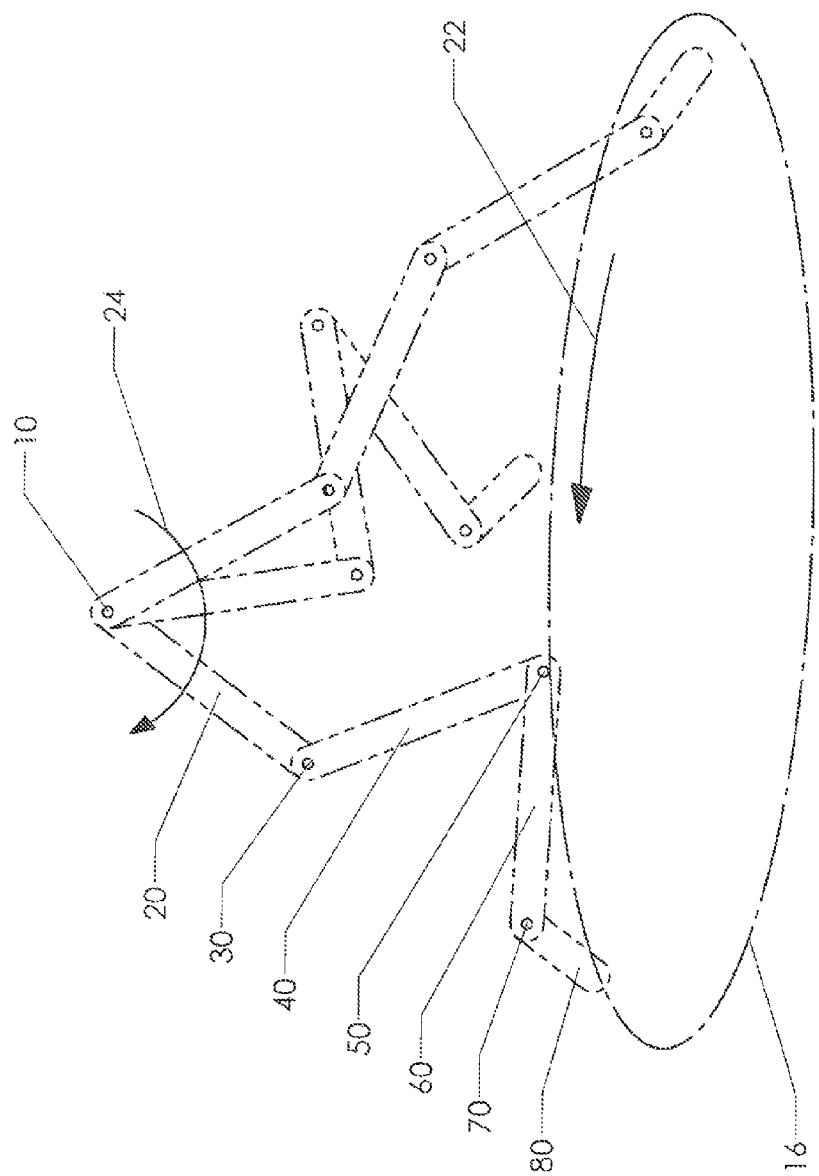
FIG. 4 shows a four link limb undergoing combined pendulum and linear oscillation.

FIGS. 3 and 4 show the combined motion of the pendulum and linear oscillations to create the cyclical motion needed for a running gait. In FIG. 3, combined loop 16 traces the trajectory of the ground-contacting part of the limb (phalanx 80). FIG. 3 shows the "thrust" part of the motion—when thigh motion 24 is toward the rear. In the context of this view, the device to which the limb is attached is "running" to the left and phalanx 80 is thrusting to the right (though the reader will understand that during the actual thrust the phalanx is in contact with the ground and preferably does not slip).

The reader will note some interesting characteristics of the portion of the cycle shown in FIG. 3. At the forward extreme of combined loop 16 the limb is extended and "reaching" for the start of the thrust stroke. In the phantom view furthest to the left, thigh 20 has just started pivoting rearward. Once ground contact is made, the limb actually retracts through the middle portion of the thrust stroke. This retraction is evident in the middle phantom view.

Proceeding toward the rear of the thrust stroke the limb again extends. This phenomenon is in fact critical to creating the push and ultimate "toe-off" needed for fast running. FIG. 4 shows the portion of the cycle when the end of the limb is lifted free of the ground and swung forward for the next stroke. Swing stroke 22 encompasses the portion of combined loop 16 where the ground-contacting phalanx 80 is free of the ground.

In the phantom view furthest to the right, phalanx 80 has just completed the toe-off end of the thrust and has been lifted free of the ground by the beginning of the limb's retraction cycle. Thigh 20 is at this point pivoting forward—as indicated by thigh motion 24. In the middle phantom view the limb has linearly retracted. This motion provides good ground clearance for phalanx 80 while it is rapidly traveling forward.

Just past the middle position shown in FIG. 4 the linear oscillation phenomenon begins to extend the limb. In the phantom view on the left of FIG. 4, the linear extension has continued as thigh 20 continues pivoting forward. The limb is therefore "reaching" toward the forward extreme of combined loop 16. Phalanx 80 will pass through the forward extreme and begin traveling rearward (with respect to the moving body) well prior to contacting the ground.

In considering the combined motion shown in FIGS. 3 and 4, one may draw some fundamental conclusions regarding the frequencies desired for the pendulum and linear oscillations. First, one may easily perceive that the pendulum oscillation completes one full cycle for each cycle of phalanx 80 around combined loop 16. In contrast, the linear oscillation completes two full cycles. The linear oscillation retracts and extends during the thrust stroke. It also retracts and extends during the swing stroke. It is therefore apparent that a 2:1 harmonic ratio preferably exists between the extension/retraction cycle and the pendulum oscillation cycle.

Figure 5:
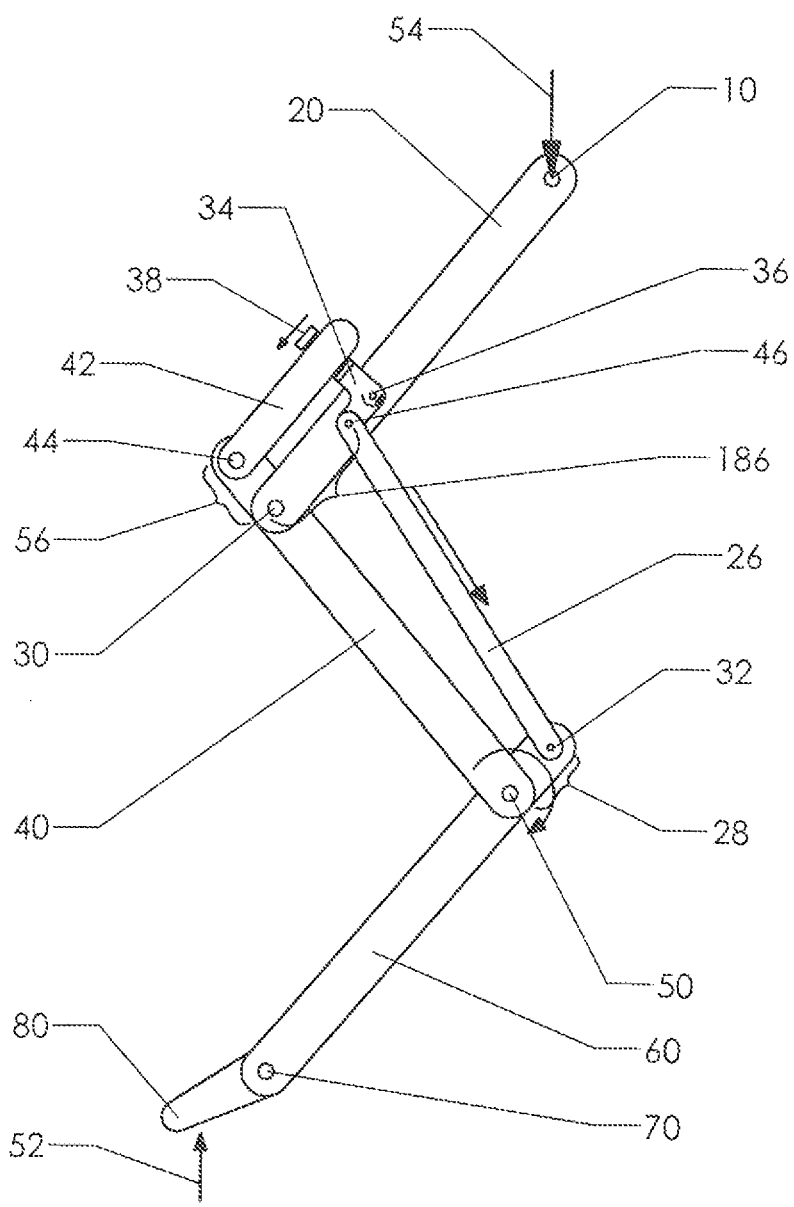
FIG. 5 shows a selective latching mechanism used to latch the knee joint.
Figure 6:
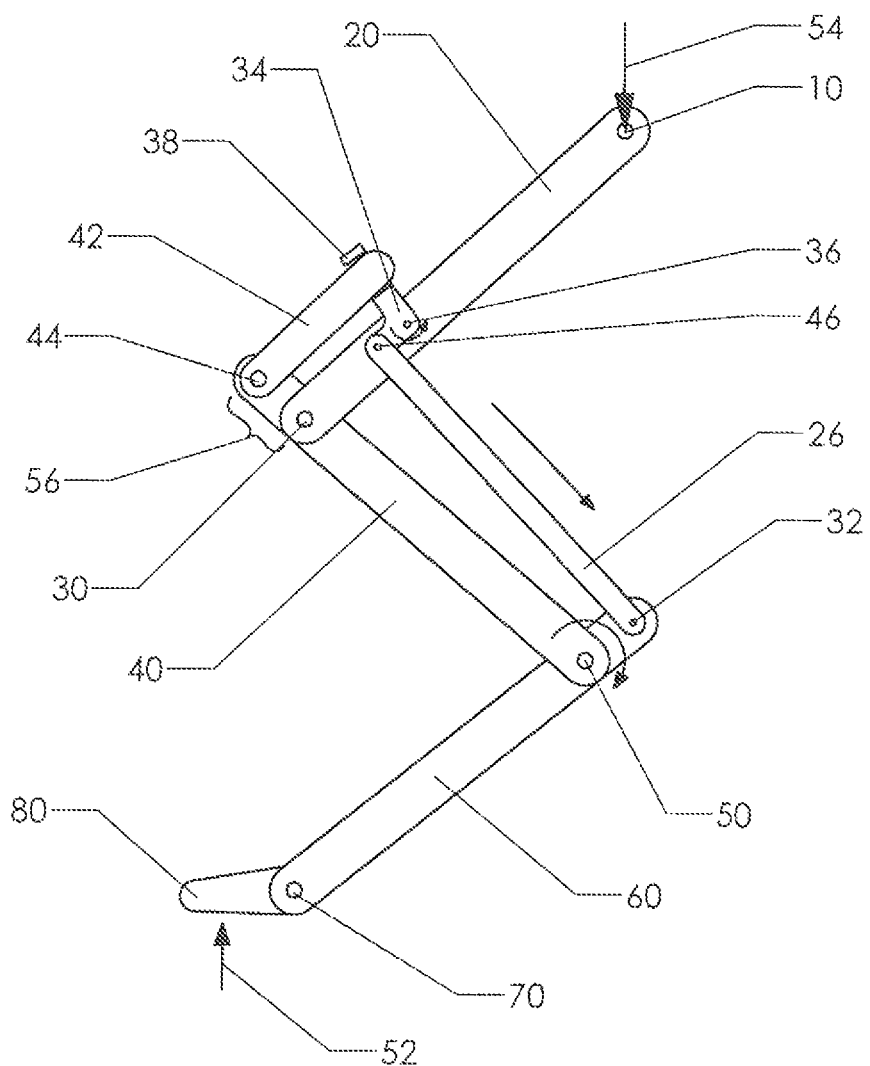
FIG. 6 shows a selective latching mechanism used to latch the knee joint.
Figure 7:
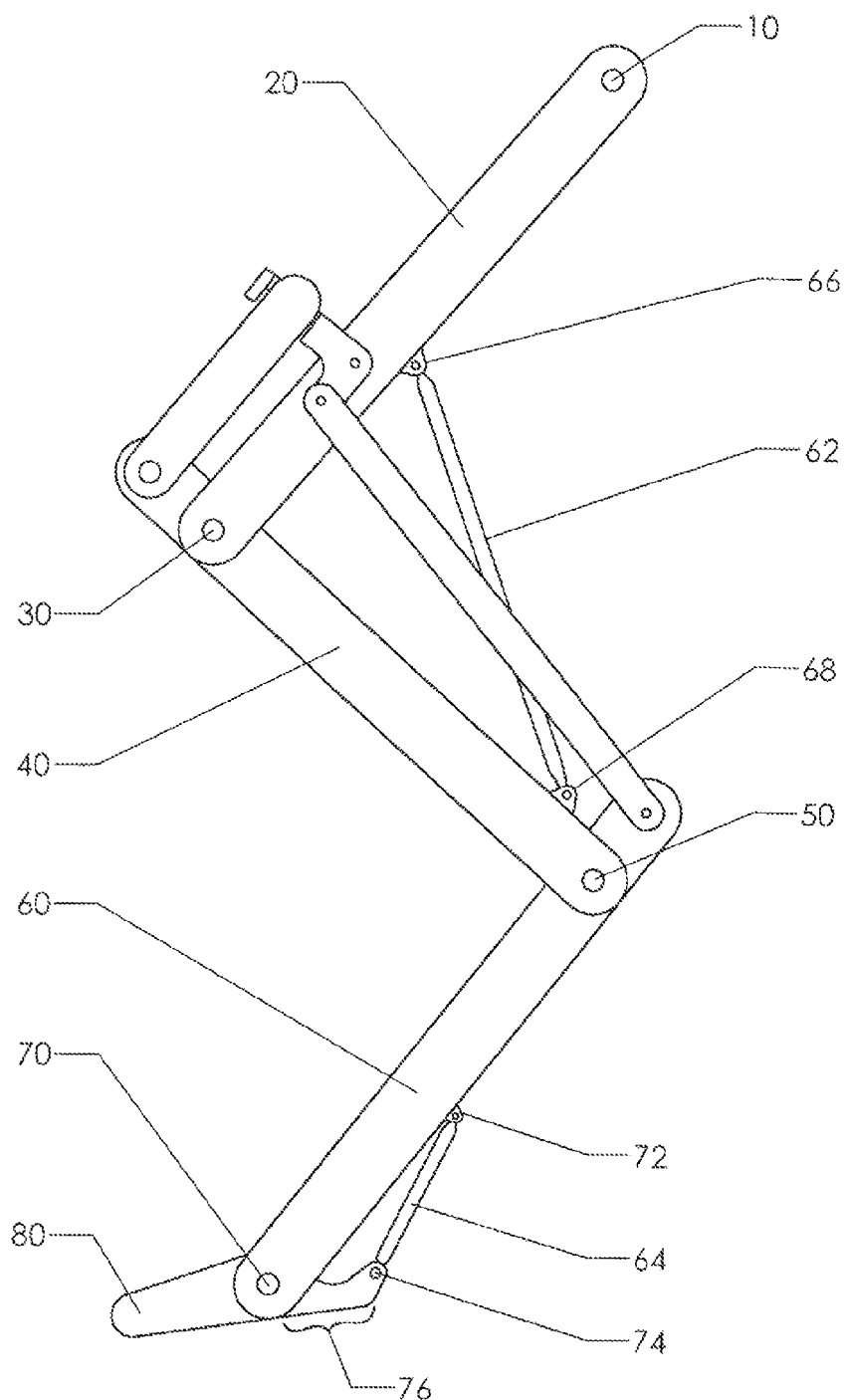
FIG. 7 shows a leg structure with the addition of elastic trim elements.

Of course, to produce the velocity amplifying and energy storage and release traits seen in a natural running gait, additional components will be required. FIGS. 5-7 present simplified depictions of a limb structure which is primarily suited for a rear limb (in either a biped or a quadruped). Limbs constructed according to the present invention will generally include a primary driven link, two or more secondary links, and one or more auxiliary links.

With respect to FIG. 5, the primary driven link is thigh 20 pivoting about hip joint 10. The secondary links are calf 40, foot 60, and phalanx 80. Calf 40 is pivotally connected to thigh 20 at knee joint 30. Foot 60 is pivotally connected to calf 40 at ankle joint 50. Phalanx 80 is pivotally connected to foot 60 at phalanx joint 70.

Achilles linkage 26 is an auxiliary link. Its primary function is to act as a velocity multiplier. By studying the geometry, the reader will note that as the leg extends foot 60 is forced to rotate clockwise with respect to calf 40. Achilles linkage 26 is connected to foot 60 at Achilles joint 32. Achilles joint 32 is separated from ankle joint 50 by a short distance denoted as Achilles lever 28. The upper end of the Achilles linkage is attached at latch driving joint 46, which is separated from knee joint 30 by a distance denoted as thigh lever 186. Thigh lever 186 is longer than Achilles lever 28. The downward extending portion of the foot is also much longer than Achilles lever 28.

Latching link 34 is able to rotate with respect to thigh 20. However, it is not able to rotate in a clockwise direction (with respect to thigh 20) any further than the position shown in FIG. 5. Thus, when the leg is extending toward the rear of the thrust stroke, Achilles linkage 26 creates a velocity-multiplying four bar linkage with thigh 20, calf 40, and foot 60. When thigh 20 reaches the rearward portion of its arc of travel, foot 60 is "whipped" rearward with substantially greater rotational velocity. And, the length of the foot means that the lower end of the foot is accelerated downward and rearward at a much higher velocity than the motion of Achilles joint 32.

The Achilles linkage also provides a second important function. It is advantageous for the leg to include a selectable knee latching feature. This is important for standing. It is also advantageous during the running motion. A dual-state for the stiffness of a knee is a function found in nature. The legs of most animals can be at least partially latched for standing, so that the muscles do not have to support the entire weight of the animal. In bipeds, this function is served by toggling the knee joint slightly over center and then latching it in position using a tendon which can rest in one of two states. The knee joints of many animals also employ the dual-state stiffness function while running.

The embodiment of FIGS. 5 and 6 includes a novel latching mechanism designed to provide a latched and unlatched state for the knee joint. In FIG. 5, the leg is in a stance position (either while at rest or in the middle of a running thrust stroke). Weight 54 is transferred from the robot the leg supports to hip joint 10. Phalanx 80 is resting on the ground. Weight resultant force 52 is placed on the phalanx. In this position it is apparent that the gravitational (or thrust) loads will tend to collapse the leg by folding it. Foot 60 rotated about ankle joint 50 in the direction indicated by the arrow. This pulls Achilles linkage 26 in the direction indicated.

The reader will note that the upper end of Achilles linkage 26 is pivotally connected to latching link 34 at latch driving joint 46. Latch link 34 is pivotally connected to thigh 20 at latching link pivot 36. The motion of Achilles linkage 26 pivots latching link 34 in a counterclockwise direction with respect to thigh 20—as shown.

Latching link 34 includes canting latch 38. This is a passage which slidably fits over latching slide 42. Latching slide 42 is a linear auxiliary link which pivotally attaches to calf 40 at slide joint 44. The reader will observe that slide joint 44 is offset from knee joint 30 via a distance denoted as slide lever 56. Latching slide 42 slides in and out of canting latch 38 as calf 40 pivots with respect to thigh 20.

In the configuration shown, latching slide 42 is able to freely slide through canting latch 38. However, when latching link 34 pivots in the direction indicated in FIG. 5 it frictionally engages latching slide 42. Once this engagement occurs, the angular relationship between thigh 20 and calf 40 becomes fixed. Depending on the material and geometry selected, the canting latch may provide a "hard" latching feature or simply a high friction versus low friction state. In either case, the result is a dual-state suspension.

FIG. 6 shows the same embodiment after latching link 34 has pivoted into a hard latched position. The reader will note that calf 40 is angularly fixed with respect to thigh 20. The reader will also note that foot 60 is angularly fixed with respect to calf 40—since Achilles linkage 26 acts as a tension member which fixes the position of Achilles joint 32. In this state, the entire limb rotates as a unit about hip joint 10. Thus, an actuator or actuators at hip joint 10 can balance the robot on the fixed leg without having to use actuator force to prevent the collapse of the leg.

The reader should bear in mind that the latching shown in FIG. 6 is produced by a compressing load placed on the leg (such as during the middle of the thrust stroke while running). However, the same latching occurs during the middle of the carry stroke shown in FIG. 4. The linear oscillation of the leg folds it upward and the knee is latched by these dynamic forces even though no external load is present.

The latching mechanism thus creates a "dual state" suspension—one in which the knee flexes freely and one in which flexure is eliminated or reduced. A reduced flexure state can be achieved using a "throttling" canting latch 38. Such a latch provides varying friction depending on the rotating force applied. Thus, rather than simply preventing the motion of latching slide 42 it may allow motion with increased friction.

The combined oscillating motion depicted in FIGS. 3 and 4 requires additional elements. Specifically, elastic elements are needed so that the leg's "rest position" is an intermediate position between full extension and full retraction. FIG. 7 shows one embodiment for the elastic elements. Upper elastic trim element 66 spans the distance between anchor point 66 on thigh 20 and anchor point 68 on calf 40. Lower elastic trim element 64 spans a distance between anchor point 72 on foot 60 and anchor point 74 on phalanx 80. The reader will observe that anchor point 74 and phalanx joint 70 are offset a distance denoted as phalanx lever 76.

The elastic elements may be configured to provide desired tension or compression for different configurations. In general, lower elastic trim element 64 will provide tension in order to rotate phalanx 80 in a counterclockwise direction with respect to foot 60. Upper elastic trim element 62 will also provide tension in order to prevent calf 40 from rotating too far in the clockwise direction with respect to thigh 20.

The general system thus disclosed can function for forelimb and hind limb structures. In fact, the operating principles are the same for both. There is some confusion, however, because anatomical references to forelimbs and hind limbs in nature tend to use different terms.

Figure 8:
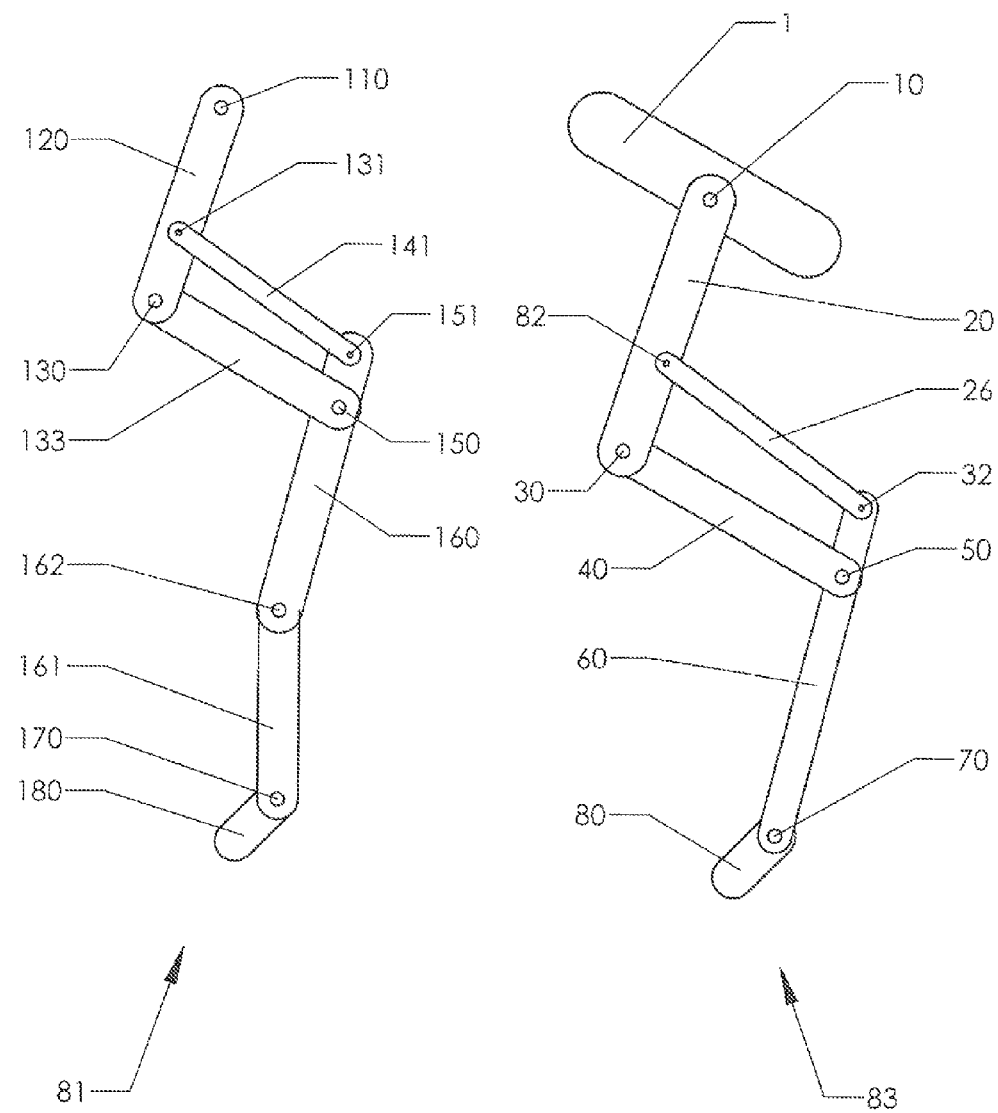
FIG. 8 shows a comparison of forelimb and hind limb structure.

FIG. 8 depicts two limb structures which illustrate this concept. Forelimb structure 81 includes one extra joint, but contains largely analogous structures to hind limb structure 83. Shoulder blade 120 is the primary driving link for the forelimb structure. It rotates about upper shoulder joint 110 (This is somewhat confusing as most people think of arm 133 as the driving link in a fore limb structure—since this is the most mobile portion for human anatomy. However, for a quadruped such as a horse or dog, shoulder blade 120 is the primary link).

The secondary links for the forelimb structure are arm 133, forearm 160, metacarpal 161, and phalanx 180. Shoulder joint 130 joins arm 133 to shoulder blade 120. Elbow joint 150 joins forearm 160 to arm 133. Wrist joint 162 joins metacarpal 161 to forearm 160. Phalanx joint 170 joins phalanx 180 to metacarpal 161.

There is no general terminology applicable to both the forelimb and hind limb structures, so one is presented in this disclosure: A multi-link robotic limb can be described in terms of its joints. "Joint 0" shall be the joint where the first link joins the "spine" (the chassis of the robot). The next joint along the limb shall be "Joint 1," with the next being "Joint 2" and so on.

With respect to the forelimb structure 81 in FIG. 8, Joint 0 is upper shoulder joint 110 (the joint between the shoulder blade and the "spine"). Joint 1 is shoulder joint 130. Joint 2 is elbow joint 150. Joint 3 is wrist joint 162. Joint 4 is phalanx joint 170.

With respect to the hind limb structure 83 in FIG. 8, Joint 0 is hip joint 10. Joint 1 is knee joint 30. Joint 2 is ankle joint 50. Joint 3 is phalanx joint 70. Using this uniform nomenclature, one may easily see that the structures in the forelimbs and the hind limbs are analogous. In nature, the lengths of the links and the couplings of the links are altered so that the forelimbs and the hind limbs may perform different motions in various gaits. The structures, however, are quite similar and the principles of the present invention can apply to either.

Auxiliary links are provided for both structures. In forelimb structure 81, extensor linkage 141 is pivotally connected at proximal extensor joint 131 and distal extensor joint 151. For hind limb structure 83, Achilles linkage 26 is pivotally connected via upper Achilles joint 82 and Achilles joint 32. Pelvis 01 is the "chassis," which is pivotally connected to thigh 20 via hip joint 10. Those skilled in the art will realize that the two types of limbs could be combined to form a quadrupedal robot. Upper shoulder joint 110 would then be connected in some fashion to pelvis 01.

Figure 9:
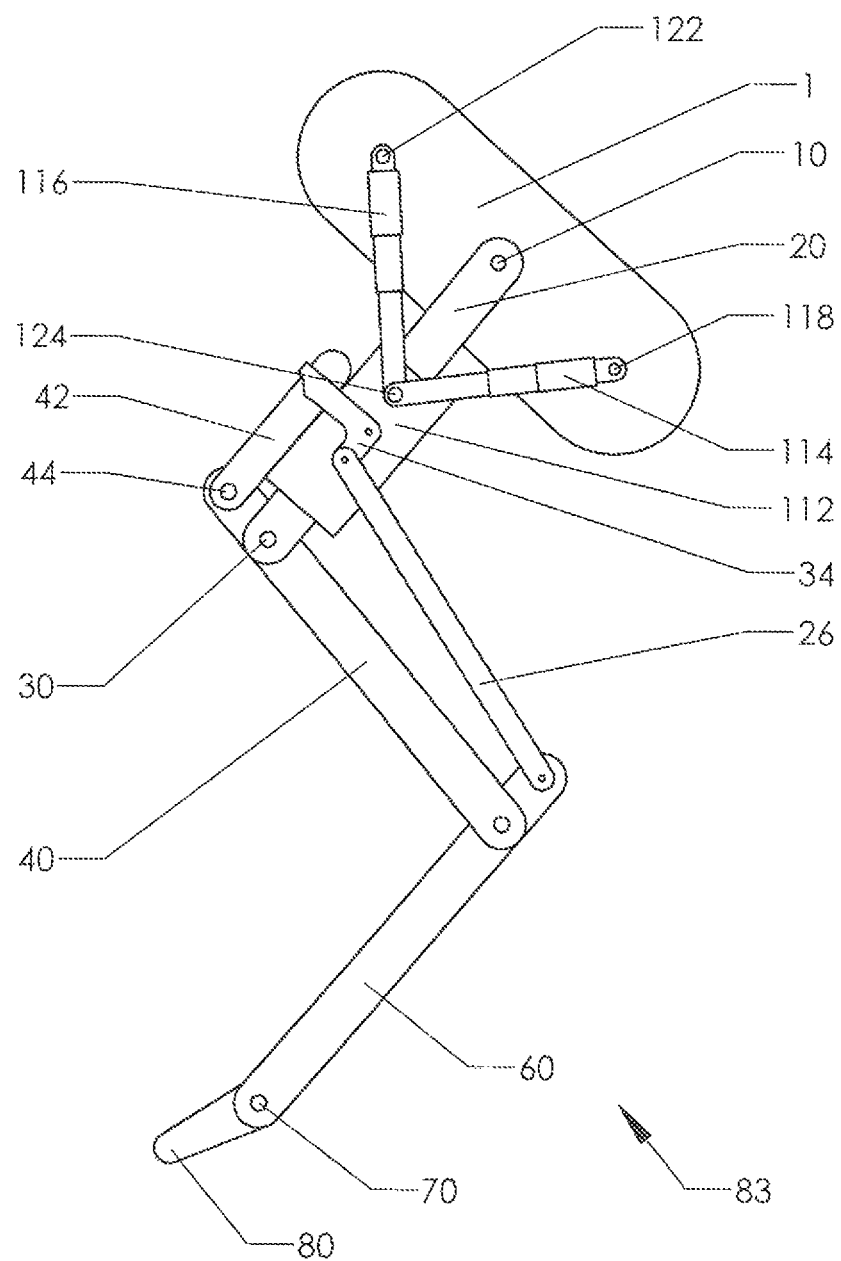
FIG. 9 shows a rear limb structure with a two-actuator drive system.

FIG. 9 shows additional details regarding the actuation of the primary driving link in a hind limb structure. Thigh is pivotally connected to pelvis 01 at hip joint 10. Two independent actuators are used to drive the thigh. Anterior actuator 116 is a linear actuator which spans the gap between pivot joint 122 and pivot joint 124. Posterior actuator 114 is a linear actuator which spans the gap between pivot joint 118 and pivot joint 124.

Pivot joint 124 lies on sliding carrier 112. Sliding carrier 112 slides along thigh 20. Those skilled in the art will recognize that the combination of the anterior and posterior linear actuators and sliding carrier 112 allows a wide variety of linear and non-linear forces to be applied to thigh 20 (assuming the presence of a suitable control system). As one example, the two linear actuators can apply a simple pendulum motion to thigh 20. If locked in position, the two linear actuators immobilize thigh 20 with respect to pelvis 01.

Suitable forces applied to the two linear actuators can also toggle latching link 34 between a latched and unlatched position as desired. In other embodiments sliding carrier 112 can be selectively fixed in position on thigh 20. It is also possible to independently actuate latching link 34 to lock and unlock the knee. The canting latch in the knee locking mechanism may be configured to apply variable friction rather than simply toggled between a latched and unlatched state.

The reader will thereby appreciate that a limb constructed according to the present invention does not include an actuator at each joint. Driving actuators may in fact only be provided on one joint—the joint attached to the driven link. The other joint or joints are passive—though devices for altering the characteristics of one or more of these joints are preferably provided.

A preferred embodiment of the limb design is incorporated in a bipedal robot resembling an ostrich. The natural dynamics of coupled links and elastic elements will enable the robot to efficiently perform the right motions at the right times. At the beginning of the swing forward, dynamic forces will cause the knee to bend (see FIG. 4). This action will cause the Achilles linkage to quickly lift the foot. These dual actions retract the leg, reducing its rotational inertia and making it easier to swing forward.

Nearing the end of the forward swing, momentum forces tend to straighten the leg. The leg will then "reach" forward. At the end of the forward swing, the leg will start to retract somewhat—reaching for and striking the ground with a cushioned impact (since the leg will be retracting somewhat during and after impact) (see FIG. 3). At higher speeds, elastic rebound will amplify these effects.

At the time of ground strike, the knee latching mechanism will actuate to activate the aforementioned "dual state" suspension. The knee joint will be stiffened to that the hip joint can ride up and over the ground contact point. The thrust portion of the cycle then begins—with the leg extending rearward. The knee joint is unlocked during this phase so that it can straighten to provide additional "toe off" toward the rearward extreme of the stroke.

The inventive design allows power utilization to be concentrated in two main actuators (see FIG. 9). However, other smaller actuators may be provided. Such actuators could provide for additional degrees of freedom such as sideways leg placement, a small degree of rotation, etc.

The preferred embodiments will use high fidelity force-controllable series elastic actuators. These actuators use small, stiff springs to sense force. The force-controllable series elastic actuators will be in series with large, nonlinear elastic driver linkages. Nonlinear elastic range of motion limit stops will also be used to drive the limbs as oscillators rather than directly. This approach will overcome prior robotic speed limitations resulting from low actuator speeds. The present approach amplifies the velocity of the actuator, while storing cyclic mechanical energy.

Figure 10:
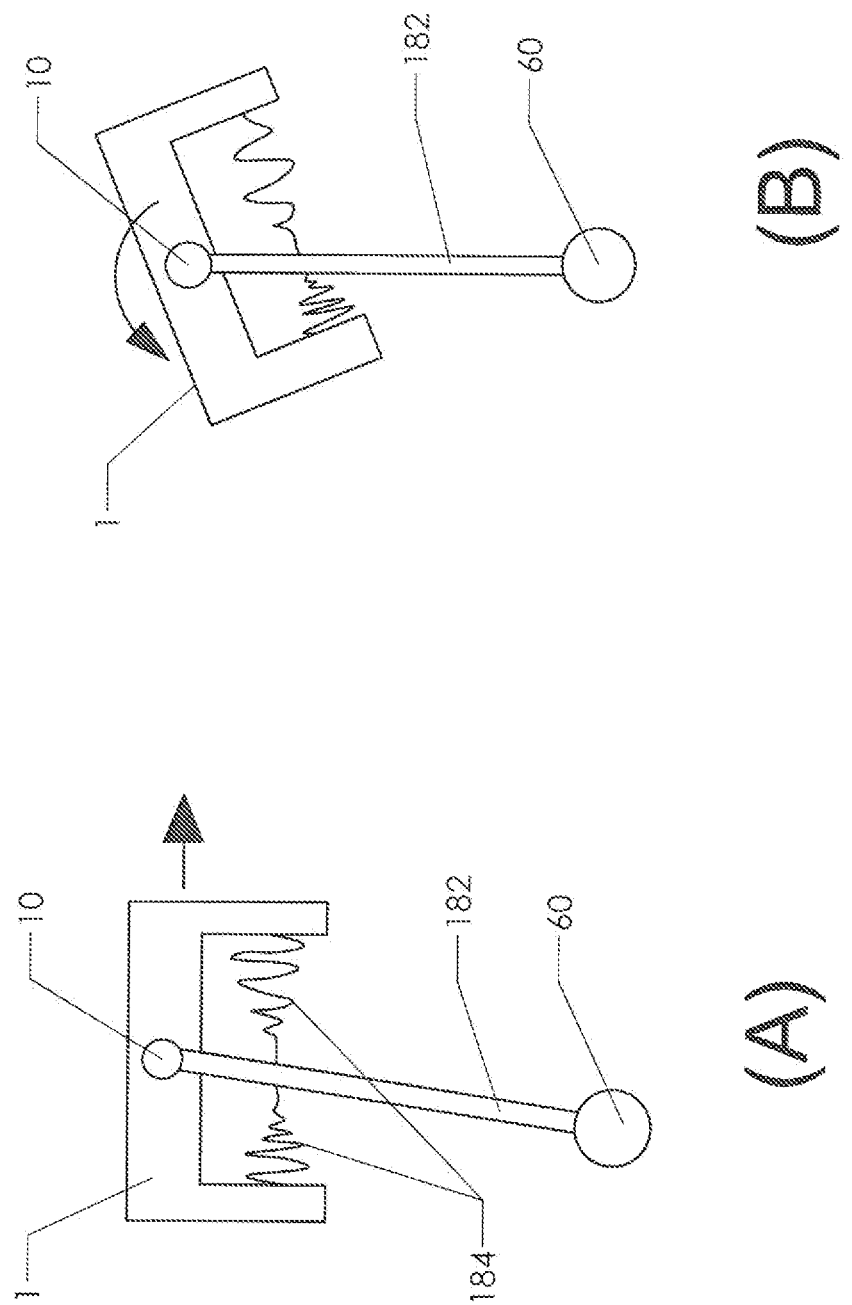
FIG. 10 shows a simplistic diagram of driving a pendulum with nonlinear elastic restraints.

FIG. 10 illustrates some of the features of cyclic driving in a very simplified fashion. The motion of a very simple limb 182 is shown. Limb 182 is suspended from hip joint 10. Foot 60 is analogous to the weight on the end of a pendulum. Non-linear elastic restraints 184 tend to return the pendulum to its neutral position.

The pendulum in FIG. 10(A) can be driven by moving pelvis 01 horizontally in a manner that leads the pendulum displacement phase by 90 degrees. Alternatively, the pendulum could be driven as at FIG. 10(B) by rotating pelvis 01 about hip joint 10—again leading the pendulum deflection by 90 degrees. The optimum method of robotic limb driving will be a combination of these two methods. The leg, being a compound pendulum, has two primary modes of oscillation. These are swinging at the hip and bending at the knee. The method of FIG. 10(A) will drive hip swing, while the method of FIG. 10(B) will drive the flexion and extension of the knee (preferably at twice the frequency of the hip swing). The method of (A) corresponds to pelvic rotation (rotating the pelvis about the yaw axis), while the method of (B) corresponds to pelvic tilt (rotating the pelvis about the pitch axis).

A third, vertical hip motion is referred to as pelvic obliquity (rotating the pelvis about the roll axis). Pelvic obliquity allows the hip to rise to accommodate grounds contact with minimal shock and to effectively push down for the energetically critical leg thrust at "toe off."

Figure 11:
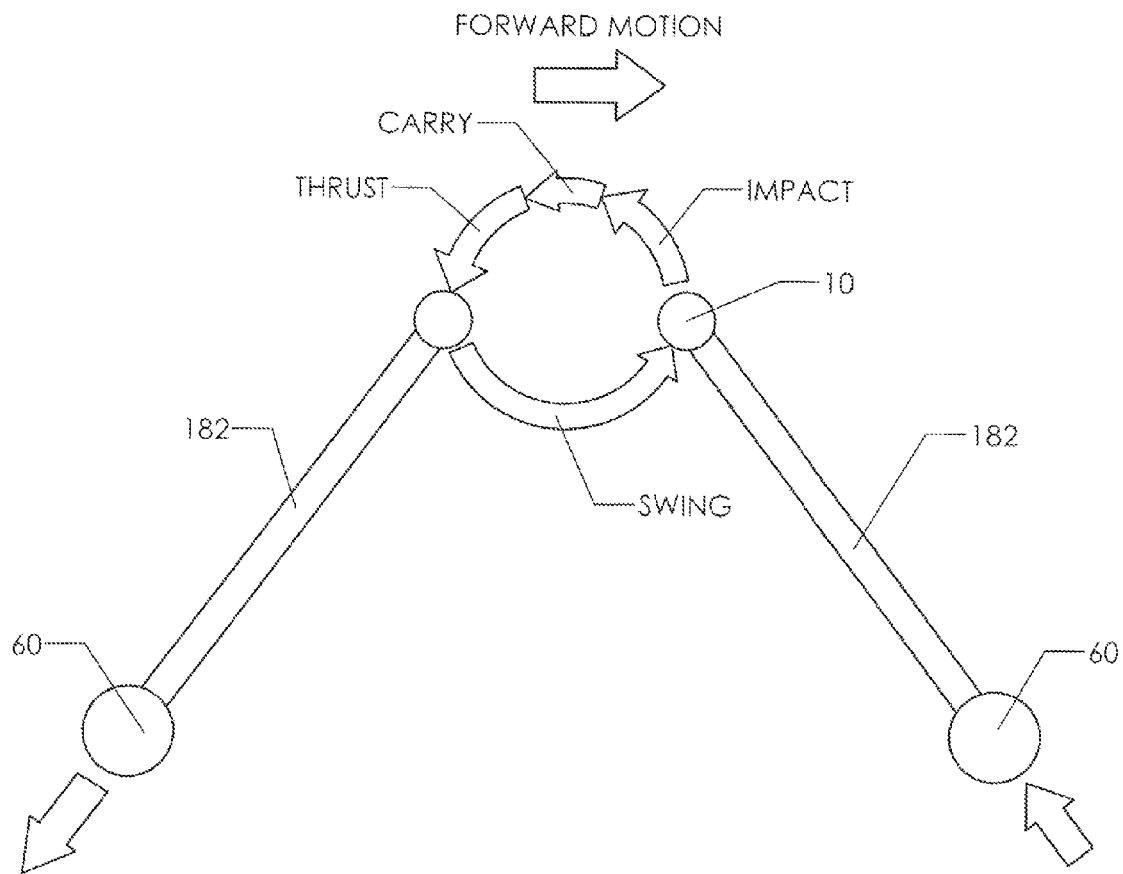
FIG. 11 shows a simplistic diagram of hip joint and foot motion for a bipedal running gait.

FIG. 11 shows this combined motion. Foot 60 makes contact with the ground as a robot moves forward in the direction indicated by the arrow. Limb 182 is capable of extending and retracting (such as by having multiple folding links connected in a knee joint).

In order to create the desired resonance for a running gate, the two main modes of oscillation are combined so that hip joint 10 is moved approximately through an arcuate motion as shown in FIG. 11. In the swing phase limb 182 swings rapidly forward. The hip joint is moved through a phase leading arc to "drag" and "whip" the limb forward (preferably with the limb's linear oscillation characteristics tending to retract it in order to reduce angular inertia and provide good ground clearance).

When foot 60 strikes the ground the motion of hip joint 10 is going through the carry phase. It travels upward to cushion the impact (which is also cushioned by the limb's tendency to retract at this point). A dual state suspension system preferably stiffens the knee joint at this point so that the hip joint carries forward and over the ground impact point in the fashion of a pole vaulter. This is the "carry" portion of the arc—meaning that the leg is not tending to extend or retract significantly but is instead carrying the weight of the robot as momentum carries the hip joint forward.

After the hip joint passes over the point of ground contact the "thrust" portion begins—in which the limb again extends and imparts thrust to the ground contacting portion. The cycle then begins again.

Somewhat counterintuitively, the hip joint may actually fall during the beginning of the swing phase and rise for the beginning of the carry phase. These polyarcuate, roughly circular hip motions are important for efficient leg driving. At the end of the forward swing, the pelvis pitches downward—driving the knee-ankle system to fully extend at the end of the forward swing. The leg then retract at touchdown to minimize impact. As the leg accepts weight, energy is stored elastically in the suspension. At the end of the carry phase, the pelvis again "nods" in pitch, this time causing the knee and ankle to extend together in the thrust stroke.

The solid structure of the pelvis effectively absorbs the impact on the forward leg and simultaneously transmits the absorbed energy to the thrust leg. This synergistic driving structure is inherently more efficient that previous robotic systems. Such dynamics are inherent in biological systems and should be emulated in robotic architecture.

The elastic linkages used in the present invention should have nonlinear force versus deflection profiles which will increase effective stiffness—and therefore resonance frequency—as amplitude increases. This feature will aid efficient running due to mechanical resonance throughout the full range of operating speeds.

Figure 12:
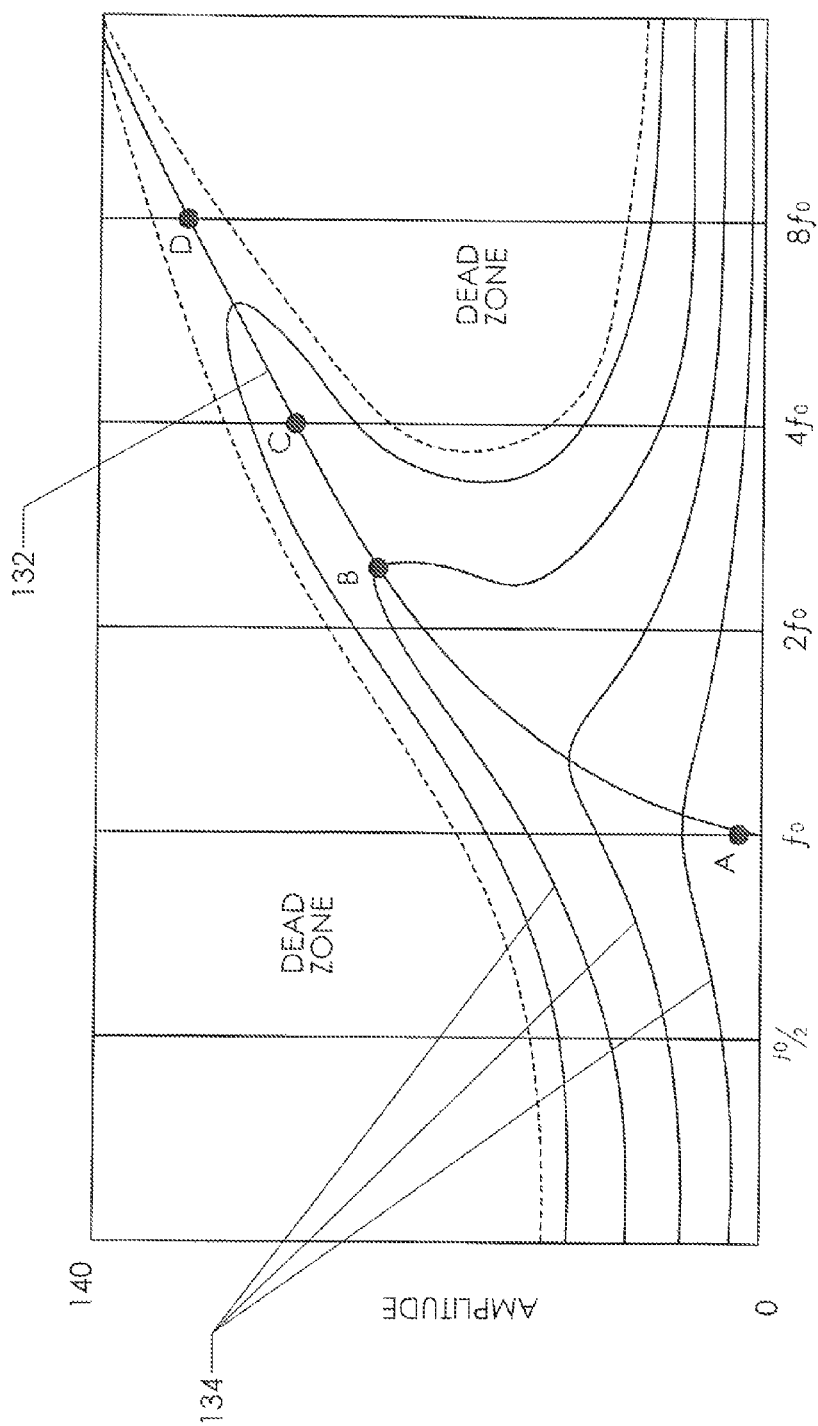
FIG. 12 shows a frequency versus amplitude diagram.

As an illustration of this phenomenon, FIG. 12 shows a plot of amplitude versus frequency response for a hypothetical non-linear oscillator. In this example, the spring force increases significantly with deflection amplitude, so its peak resonant amplitude is not vertically oriented over a single fundamental frequency, as would be the case with a strictly linear oscillator.

In such a system, parametric driving may be used to phase lead the deflection by ninety degrees. As the system gains energy, its state moves along resonant crest curve 132. Each energy state will have a particular amplitude response curve 134. However, as energy increases, the peak of the amplitude response curve will shift to a higher frequency.

At a low energy state—such as shown at Point A—the system has a fundamental frequency of $f_0$ and a relatively low amplitude. From that point the system gains energy and amplitude through progressively higher frequencies at Points B, C, and D. The fundamental frequency at Point D is eight times that at Point A, with a much higher amplitude. The condition at Point D is stable due to the intervening dead zone.

The reader should note that the state at Point D would not be obtainable by initially driving the system at the higher frequency. This attempt would produce the condition at Point E, and the system would not be able to accelerate through the intervening dead zone. Thus, as for biological systems, such a resonator must be driven progressively through higher states in order to achieve a higher speed. Parametric driving—always leading deflection by 90 degrees—causes the system state to approach and then climb the resonant crest curve.

Similar to the plot of FIG. 12, a leg assembly constructed according to the present invention will exhibit a range of resonant frequencies increasing as a function of amplitude. To run at high speeds, the robot will start slowly, with the legs oscillating at the fundamental frequency. As the amplitude increases, the control system will maintain its 90 degree phase lead with each motion cycle, thereby maintaining nonlinear resonance at higher and higher frequencies. Optimal driving will follow the resonant crest curve upward.

The leg design in the present invention will preferably be decoupled from gravity both during stance and during at least a portion of the swing cycle. In the swing phase, the elastic trim elements will cause the leg to assume an intermediate resting position between full extension and full retraction. The swing phase gravitational decoupling facilitates harmonic modal stack driving, where force inputs from the main drive actuators cause compound nonlinear resonant modal oscillations centered on the gravitationally decoupled default position. During the swing phase, the knee suspension will be at a relatively low stiffness value, optimized for efficient swing phase harmonic driving dynamics.

The dual state knee suspension—in its simplest form—toggles between a latched and an unlatched state. During the swing phase (shown in FIG. 4) the knee is unlatched and is therefore relatively flexible. This allows the leg to retract easily through the middle of the swing phase. During the thrust stroke (shown in FIG. 3) the knee is latched into a relatively stiff state so that the impact and thrust loads may be borne without collapsing the leg.

The latched phase will trigger automatically when the ground contacting portion of the leg hits the ground. A review of the forces and leg geometry shown in FIG. 5 make the automatic triggering mechanism clear. It is significant to note that the knee latching can occur at any knee angle. This fact allows a robot to run quickly over moderately rough terrain, such as cobblestones and rolling hills, without sensing or prior knowledge of the terrain. The leg's nonlinear elastic suspension will be tuned so that stiffness increases appropriately with increased deflection and running speed. As shown in FIG. 4, the natural dynamic motion of the leg results in high ground clearance during the swing, and then combined extension and retraction at the end of the swing.

During the thrust stroke, the dynamic motion of the leg results in foot trajectories in and near the ground conforming to the geometry of a virtual sphere centered in space far above the robot's center of gravity. The robot will therefore possess inherent geometric stability.

It is important to understand the velocity multiplication characteristics of the proposed leg geometry. FIG. 5 shows the attachment points for Achilles linkage 26. The reader will observe that the distance denoted as thigh lever 186 is greater than the distance denoted as Achilles lever 28. This difference produces a velocity multiplier as the leg extends toward the end of the thrust stroke. At this point thigh 20 will be pivoting in a counterclockwise direction. As the leg extends, foot 60 will be pivoted in a counterclockwise direction at a higher rate. The length of foot 60 also imparts a higher velocity to its distal end. The result is that as thigh 20 reaches toward the rear of its stroke, foot 60 "whips" rearward and imparts a very fast "toe-off" thrust.

In the dynamic environment of fast running, the knee will extend toward the rear of the thrust stroke. Even when the swing velocity of the thigh passes through zero and begins to reverse, the knee will still be extending and the Achilles linkage will cause the foot to whip rearward. This motion is energetically significant to the thrust produced.

Each leg of a bipedal robot will be configured as a coupled nonlinear oscillator network having a number of modes of vibration. These modes will be configured such that their respective impedances are resonant at differing frequencies—which will be harmonic multiples of the lowest modal frequency. This fact means that excitation waves, one for each modal frequency, can be combined as terms in a Fourier series. The resulting waveform can then be applied by a single main drive actuator.

Suspensory end effectors ("toes" such as depicted as phalanx 80) would preferably be driven by a higher harmonic so that they would tend to extend or retract very quickly at the extremes of the hip swing cycle. An end effector analogous to the foot of an ostrich is particularly effective for a bipedal robot, since this provides an effective suspension and polygon for support during stance.

A control system must of course be provided for controlling a bipedal robot using the proposed leg geometry. Each leg will be driven as a multimodal nonlinear harmonic oscillator with the parameters of the drive function being modulated by modal feedback from the leg. In addition to driving the legs, the control algorithm must also ensure stability of the robot's pitch and speed.

Speed will be controlled by changing the legs' driving parameters. The natural swing leg retraction cycle helps bring the step length to an appropriate value for each speed. The step length should be largely self-stabilizing. The natural swing cycle will also help to regulate the speed of the thrust cycle, making the tasks required of the control system much simpler. Instead of using a controller to produce self stabilizing properties, these properties will be built into the nonlinear dynamics of the leg structures. The controller will then "ride atop" these inherent characteristics by modulating the gain of the Fourier waveforms sent to the main drive actuators and by controlling the inclination of the dynamic stability vector.

Pitch of the body will be controlled by modulating the main support leg drive during stance. This is a standard technique for most legged robots. However, a robot constructed according to the present inventive techniques is capable of running at 30 mph and possibly even more. At these speeds, stance time is very short, making body pitch control much more challenging.

Several aspects of the proposed leg geometry should help, however. First, the legs will have much less inertia than the body (since there are no heavy actuators mounted on the rapidly swinging portions). Second, the pronounced retraction of the leg during the swing cycle will further reduce rotational inertia. Thus, even though the legs are moving quite rapidly, they will have a relatively small effect on the pitch of the body. The concave upward motion track of the rearward leg swing (the fact that the leg retracts during the middle of the thrust stroke) should also have a stabilizing effect on vertical orientation. These factors will lessen the burden on the pitch controller.

The control system will stabilize the pitch to be approximately level as an average value. However, as discussed previously, the pelvis should actually be cycled in yaw and pitch (and to a lesser extent preferably in roll) in order to create efficient leg motion. At running speeds these oscillations will be small due to the relatively large moment of inertia of the body and its high impedance at these frequencies.

The controller notes the body position and generates a waveform which spatially leads that position by 90 degrees. This waveform is multiplied by an operator-determined gain at each actuator to generate the desired Fourier harmonic stack used to drive the body and limbs. Postural control is subsumed within, this approach.

The collective deflection of the legs fore and aft is considered to be a vertical waveform, since the main body will pitch up and down as torque is applied to cause this collective motion of the two legs together. The motion of the legs in opposing phase fore and aft is considered a horizontal waveform, since the main body will oscillate in yaw as torques are applied to cause these motions.

As explained previously, the vertical waveform component will occur at twice the horizontal waveform frequency for optimum Fourier limb driving. Throttle signals from the operator will collectively modulate the amplitude of the gains on these Fourier driving waveforms, while steering signals will adjust the gains right and left to induce directional rotation.

Figure 13:
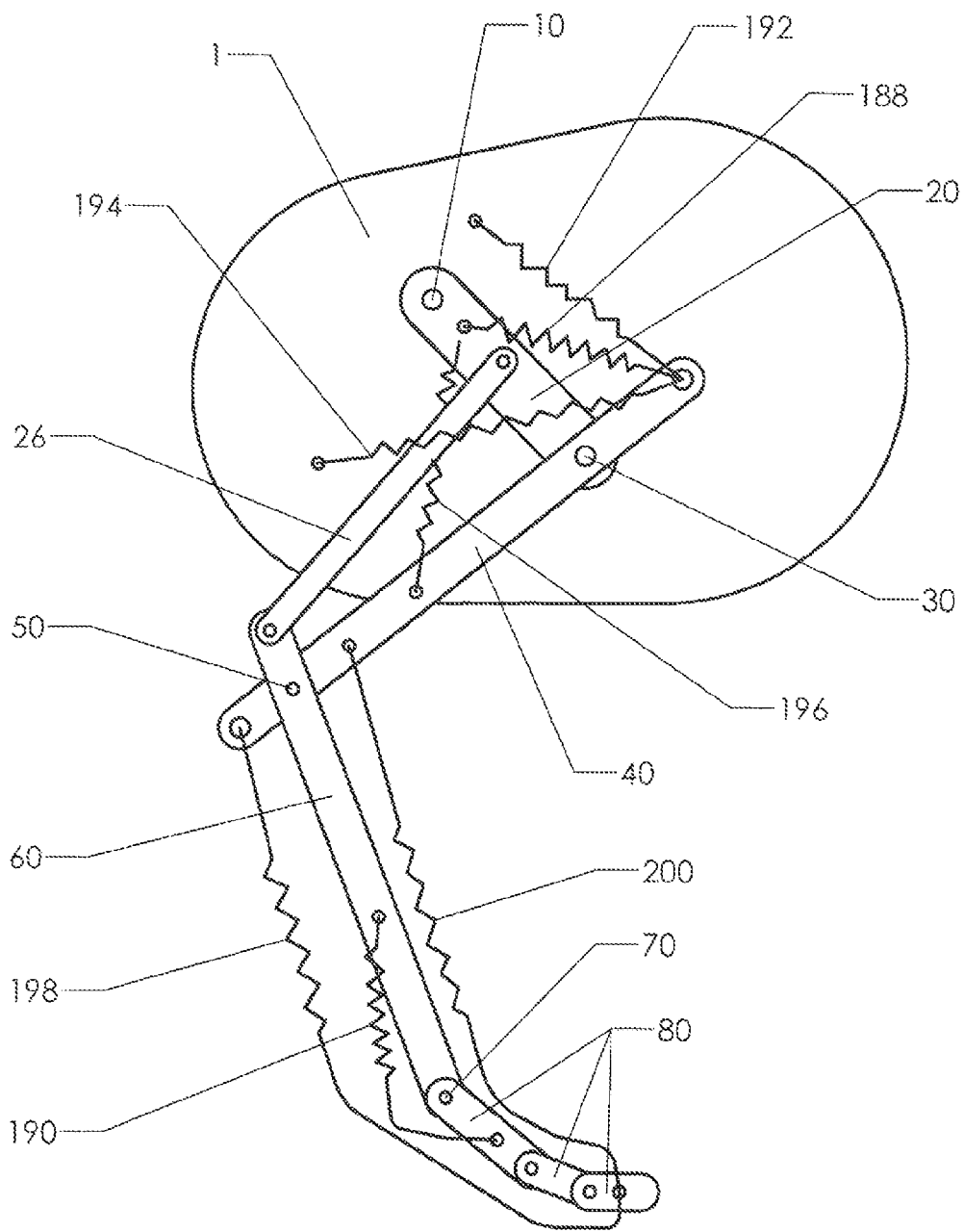
FIG. 13 shows a leg structure with associated elastic elements.

Elastic coupling elements are preferably used in the present invention to facilitate operation. The actuators in a robot are analogous to the muscles in an animal. The elastic coupling elements in a robot are analogous to the connective tissues in an animal. FIG. 13 schematically illustrates the placement of several elastic coupling elements in a hind limb used for a bipedal robot.

Front extensor spring 192 links the free end of calf 40 to pelvis 01. Back extensor spring 194 links this same point to an anterior and inferior anchor point on the pelvis. Knee suspension 188 links the free end of the knee to thigh 20.

Passive swing spring 196 links calf 40 to thigh 20. Toe suspension 190 links foot 60 to phalanx 80 (the first phalanx in a three-phalanx toe construction). Toe extension tendon network 200 links the phalanxes to calf 40 on the anterior and superior side. Finally, toe flexion tendon network 198 links the phalanxes to calf 40 on the posterior and inferior side.

The function of these elastic coupling elements will now be generally explained. As stated previously, the "links" in this structure are pelvis 01, thigh 20, calf 40, foot 60 (coupled with achilles linkage 26), and three phalanxes 80. There are six pivot joints—hip joint 10 ("Joint 0"), knee joint 30 ("Joint 1"), ankle joint 50 ("Joint 2"), a first phalanx joint 70 ("Joint 3"), a second phalanx joint 70 ("Joint 4"), and a third phalanx joint 70 ("Joint 5").

Achilles linkage 26 creates a closed-loop four bar mechanism which couples the knee to the ankle with an approximate 1:1.5 transmission ratio. This acts as a foot velocity amplifier.

The structure of FIG. 13 uses three toe (phalanx) segments. Toes are important in a running gait because they allow a foot to roll as it pushes off at the end of the stance phase of motion. The result is a smoother trajectory of the robot's center of mass.

Two suspension elements illustrated in FIG. 3 are used to store and release gravitational forces during running. These are knee suspension 188 and toe suspension 190 (basically these are tension springs). Some of the energy stored in knee suspension 188 is converted into forward thrust during the energy release phase—thanks to the leg architecture. Knee suspension 188 is preferably implemented with a non-linear spring. The knee suspension is active during stance, supporting the body weight. The knee suspension is inactive during the forward swing of the leg—allowing for a full radial contraction of the leg which provides better ground clearance. It is preferable for the leg to freely retract during the forward stroke as this reduces the leg moment of inertia and permits a faster forward swing.

Toe suspension 190 provides an uplifting force on the toes which tends to counteract the effect of gravity. Toe suspension 190 is preferably implemented using a spring in series with a cable, crossing the first phalanx joint with a pulley. The toe suspension emulates a muscle connected to bones through tendons. Such a configuration may be referred to as a "tendon network." A tendon network is formed by a plurality of non-linear elastic elements. Each element connects to at least two links and crosses at least one joint—though some may cross two or more joints.

The toe suspension starts applying a torque around phalanx joint 70 when the first phalanx 80 flexes forward. This torque is used to push off with the toes during the running gait. During the forward swing phase toe suspension 190 tends to curls the phalanxes back and under foot 60—thereby providing the desired additional ground clearance.

Three of the suspension elements are used to enhance the forward swing motion of the leg. These are: front extensor spring 192, back extensor spring 194, and passive swing spring 196. The front extensor spring is used to extend the leg at the end of the backward swing. The back extensor spring is used to extend the leg at the end of the forward swing. Leg extension is desirable at the end of the forward swing to prepare the leg for landing. Leg extension is desirable at the end of the backward swing to push off and provide thrust.

The passive swing spring is attached from the calf to the thigh. This spring helps retract the leg during the forward swing. Non-linearity is highly desirable in this spring to ensure leg radial contraction over a large range of velocities (as more force is required to retract the leg at high speed).

Passive actuation of the phalanxes is a significant challenge in the running gait. The phalanxes (toes) must flex (curl down and back) when the leg is swinging forward to increase ground clearance. They must also extend at the end of the forward swing to prepare for ground contact. To achieve these characteristics, two toe tendon networks are preferably used. Toe extension tendon network 200 is attached from calf 40 to the final toe segment, crossing all the toe joints. It is preferably implemented as a spring connected by cables. When the leg extends forward, the spring element in toe extension tendon network 200 is stretched and causes the toes to extend (pull upward).

Toe flexion tendon network 198 also preferably includes a spring or springs connected by cables. It extends around the bottom of the foot and toes. When the leg is retracted after the end of the thrust stroke, toe flexion tendon network 198 causes the toes to flex and curl down and back.

The "dual state" suspension system is an important component of the present invention. The dual state is preferably achieved by either (1) selectively locking and unlocking one of the joints—such as the knee joint; and/or (2) changing the characteristics of one or more of the tendon networks. The dual state need not be a "hard" transition (such as a joint which is either completely free or completely locked). Rather, it may be a transition between two states of varying flexibility—such as a knee joint that moves stiffly versus one that moves freely.

The reader may wish to understand some examples of how the dual state suspension may be achieved—though the particular examples provided should not be viewed as limiting. FIG. 5 shows a particular embodiment for knee joint 30. The operation of canting latch 34 has been explained previously. This purely mechanical solution could be replaced by other embodiments. Latching slide 42 could be a conductive rod that passes through an electromagnet. Selectively energizing the electromagnet would then alter the knee suspension state. Other possible embodiments include: (1) a variable-resistance clutch mechanism on knee joint 30; (2) an elastic element across the knee joint having variable properties (possibly achieved by moving the anchor point of the elastic element); (3) a pneumatically actuated variable clutch; (4) a hydraulically actuated variable clutch; and (4) a dynamically-actuated mechanism which is triggered by a moving mass.

However the dual state suspension is actually realized, it is important that it increase the stiffness of at least one joint when the ground-contacting portion of the limb structure is in contact with the ground and reduce the stiffness when the ground-contacting portion leaves the ground.

Having now received a description of the operating features of the invention, those skilled in the art will realize that many variations are possible. These include, without limitation:

(1) The force input to the limb can be made at locations other than the thigh. Multiple inputs can be made in multiple locations;

(2) Using the provided nomenclature of Joint 0 . . . Joint n, one may generalize as follows: Joint 0 joins the first link to the chassis. Joint 0 preferably attaches a link which extends forward with respect to the chassis and has a locking feature—such as a knee. Joint 1 attaches a link which extends backward and is connected to Joint 1 by a 4-bar linkage (the Achilles linkage);

(3) The invention obtains velocity multiplication from kinematics;

(4) The Achilles linkage can be elastic to some extent;

(5) The use of non-linear elasticity contributes greatly to velocity amplification;

(6) Trim actuators can be added to adjust bias so that the "rest" position of a limb is altered as desired;

(7) The "dual state" suspension need not be a "hard" lock. The joint may still be able to flex in the "locked" condition, but at a much higher stiffness than in the free condition; and (8) The "dual state" suspension may engage a plurality of joints, rather that a single one. In addition, it may engage a set of elastic elements in a tendon network rather than just acting as a rigid lock of the joint itself.

The preceding description contains significant detail regarding the novel aspects of the present invention. It is should not be construed, however, as limiting the scope of the Having described my invention, I claim:

1. A robotic limb structure, comprising:
   a. a chassis;
   b. a first link, having a first end and a second end, rotatably connected to said chassis by a Joint 0;
   c. a second link, having a first end and a second end, rotatably connected to said first link by a Joint 1;
   d. a third link, having a first end and a second end, rotatably connected to said second link by a Joint 2;
   e. a fourth link, rotatably connected to said third link by a Joint 3;
   f. said Joint 1 lying between said first and second ends of said second link;
   g. said Joint 2 lying between said first and second ends of said second link and between said first and second ends of said third link;
   h. said first link having an upper Achilles joint lying between said Joint 0 and said Joint 1;
   i. said third link having a lower Achilles joint lying proximate said first end of said third link, whereby said Joint 2 lies between said lower Achilles Joint and said Joint 3;
   j. an Achilles linkage rotatably connected to said upper Achilles joint and rotatably connected to said lower Achilles joint;
   k. a knee suspension mechanism providing rotational resistance between said first link and said second link about said Joint 1, wherein said knee suspension mechanism is configured to change between a high level of rotational resistance about Joint 1 and a low level of rotational resistance about Joint 1;
   l. said knee suspension mechanism being configured to change to said high level of rotational resistance when said Joint 3 is moving toward said Joint 0 and being configured to change to said low level of rotational resistance when said Joint 3 is moving away from said Joint 0;
   m. wherein a rotation of said first link about said Joint 0 is driven by an actuator; and
   n. wherein said second link is configured to rotate about said Joint 1 irrespective of said rotation of said first link about Joint 0.

2. A robotic limb structure as recited in claim 1, further comprising an elastic element connected between said first link and said first end of said second link.

3. A robotic limb structure as recited in claim 1, further comprising:
   a. an elastic element connected between said first link and said first end of said second link; and
   b. an elastic element connected between said third link and said fourth link across said Joint 3.

4. A robotic limb structure as recited in claim 3, wherein said robotic limb structure has a resting state, wherein:
   a. said first link extends forward from said Joint 0;
   b. said second end of said second link extends rearward from said Joint 1;
   c. said second end of said third link extends forward from said Joint 2; and
   d. said second end of said fourth link extends forward from said Joint 3.

5. A robotic limb structure as recited in claim 4, further comprising a front extensor spring connected between said first end of said second link and said chassis.

6. A robotic limb structure as recited in claim 5, further comprising a back extensor spring connected between said first end of said second link and said chassis, wherein a connection between said back extensor spring and said chassis lies behind and below said Joint 0.

7. A robotic limb structure as recited in claim 4, further comprising a passive swing spring connected between said first link and said third link.

8. A robotic limb structure, comprising:
   a. a chassis;
   b. a first link, having a first end and a second end, rotatably connected to said chassis by a Joint 0;
   c. a second link, having a first end and a second end, rotatably connected to said first link by a Joint 1;
   d. a third link, having a first end and a second end, rotatably connected to said second link by a Joint 2;
   e. a fourth link, rotatably connected to said third link by a Joint 3;
   f. said Joint 1 lying between said first and second ends of said second link;
   g. said Joint 2 lying between said first and second ends of said second link and between said first and second ends of said third link;
   h. said first link having an upper Achilles joint lying between said Joint 0 and said Joint 1;
   i. said third link having a lower Achilles joint lying proximate said first end of said third link, whereby said Joint 2 lies between said lower Achilles Joint and said Joint 3;
   j. an Achilles linkage rotatably connected to said upper Achilles joint and rotatably connected to said lower Achilles joint;
   k. a knee suspension mechanism providing rotational resistance between said first link and said second link about said Joint 1, wherein said knee suspension mechanism is configured to change between high level of rotational resistance about Joint 1 and a low level of rotational resistance about Joint 1;
   l. said knee suspension mechanism being configured to change to said high level of rotational resistance when said Achilles linkage is in tension;
   m. said knee suspension mechanism being configured to change to said low level of rotational resistance when said Achilles linkage is not in tension;
   n. wherein a rotation of said first link about said Joint 0 is driven by an actuator; and
   o. wherein said second link is free to rotate about said Joint 1 irrespective of said rotation of said first link about Joint 0.

9. A robotic limb structure as recited in claim 8, further comprising an elastic element connected between said first link and said first end of said second link.

10. A robotic limb structure as recited in claim 8, further comprising:
    a. an elastic element connected between said first link and said first end of said second link; and
    b. an elastic element connected between said third link and said fourth link across said Joint 3.

11. A robotic limb structure as recited in claim 10, wherein said robotic limb structure has a resting state, wherein:
    a. said first link extends forward from said Joint 0;
    b. said second end of said second link extends rearward from said Joint 1;
    c. said second end of said third link extends forward from said Joint 2; and
    d. said second end of said fourth link extends forward from said Joint 3.

12. A robotic limb structure as recited in claim 11, further comprising a front extensor spring connected between said first end of said second link and said chassis.

13. A robotic limb structure as recited in claim 12, further comprising a back extensor spring connected between said first end of said second link and said chassis, wherein a connection between said back extensor spring and said chassis lies behind and below said Joint 0.

14. A robotic limb structure as recited in claim 11, further comprising a passive swing spring connected between said first link and said third link.

* * * * *